United States Patent
Korthout et al.

(10) Patent No.: US 7,659,516 B2
(45) Date of Patent: Feb. 9, 2010

(54) C-MOS SENSOR READOUT FROM MULTIPLE CELLS ACROSS THE ARRAY TO GENERATE DOSE SENSING SIGNAL

(75) Inventors: Alouisius Wilhelmus Marinus Korthout, Drunen (NL); Willem Johan De Haan, Eindhoven (NL); Adrianus Johannes Mierop, Eindhoven (NL)

(73) Assignee: DALSA Corporation, Waterloo (CA)

( * ) Notice: Subject to any disclaimer, the term of this patent is extended or adjusted under 35 U.S.C. 154(b) by 269 days.

(21) Appl. No.: 11/476,779

(22) Filed: Jun. 29, 2006

(65) Prior Publication Data
US 2008/0001094 A1 Jan. 3, 2008

(51) Int. Cl.
*G01T 1/24* (2006.01)
(52) U.S. Cl. ............................................. 250/370.07
(58) Field of Classification Search ............... 250/370.01–370.15; 378/98.8, 117, 97
See application file for complete search history.

(56) References Cited
U.S. PATENT DOCUMENTS

| | | | | |
|---|---|---|---|---|
| 4,493,058 A | * | 1/1985 | Adam | 365/185.05 |
| 4,573,183 A | * | 2/1986 | Relihan | 378/108 |
| 5,319,696 A | * | 6/1994 | Abdel-Malek et al. | 378/108 |
| 6,163,029 A | * | 12/2000 | Yamada et al. | 250/370.09 |
| 6,760,405 B2 | * | 7/2004 | Ruetten et al. | 378/98.8 |
| 6,838,673 B2 | | 1/2005 | Morishita | |
| 2004/0101100 A1 | | 5/2004 | Morii et al. | |

FOREIGN PATENT DOCUMENTS

WO   WO 2005/078477 A1   8/2005

OTHER PUBLICATIONS

Zarnowski et al., "Scientific CMOS CID imagers," 1996, the Proceedings of SPIE, vol. 2654, pp. 29-37.*
Kawahito et al., "A low-noise signal detection technique in CMOS image sensors using frame oversampling and non-destructive high-speed readout," 2002, Proceedings of SPIE, vol. 4669, pp. 98-106.*

* cited by examiner

*Primary Examiner*—David P Porta
*Assistant Examiner*—Kiho Kim
(74) *Attorney, Agent, or Firm*—Fisher Technology Law PLLC

(57) ABSTRACT

An array-based C-MOS sensor device is provided with a facility for on the basis of non-destructive cell readout generating a radiation dose-sensing signal. In particular, the facility is arranged for accessing a subset of multiple distributed C-MOS cells across the array and feeding by such accessed cells an algorithmic means for therein generating an overall feedback dose control signalization and/or an over-all trigger signalization.

19 Claims, 2 Drawing Sheets

C-MOS SENSOR READOUT FROM MULTIPLE CELLS ACROSS THE ARRAY TO GENERATE DOSE SENSING SIGNAL

BACKGROUND OF THE INVENTION

The invention relates to an array-based C-MOS sensor device that is provided with a facility for on the basis of non-destructive cell readout generating a radiation dose-sensing signal as being recited in the preamble of Claim 1. It is to be noted that in this application C-MOS sensor means that the sensor is based on CMOS (=Complimentary Metal Oxide Semiconductor) technology or on NMOS technology or on PMOS technology. In CMOS technology both NMOS and PMOS technology is used.

Such sensors have been in use for imaging transmission patterns from ionizing radiation, that without limitation are used in medical diagnostics. Dosage determination is essential, because applying too little radiation will result in unclear and/or faulty images produced. On the other hand, extending the time of irradiating too much can have a negative influence on the health of a subject that is irradiated, or other unwanted effects.

Prior art, in particular U.S. Pat. No. 5,887,049 to Fossum uses a plurality of specific edge detector elements in C-MOS technology to activate the pixel array for so producing a self-triggered X-ray sensor. In contradistinction, the present inventors have recognized that with presently advanced technology it would be feasible to distribute the detector cells across the array without negatively influencing the operation of the overall array. For one, generally in medical applications the effective cell pitch can be relatively much larger than would be actually attainable through state-of-the-art technology. Larger cells allow to assign to certain selected cells inside the array a specific readout facility for control purposes, such as represented by an extra transistor and/or additional wiring.

On the other hand, the present inventors have recognized that non-destructive read-out of the whole of a multi-cell array requires much time and complicated access operations. Therefore, readout out of a relatively small subset of the overall array would allow to produce a fast, simple and low-energy means for signaling actual exposure of the array.

SUMMARY TO THE INVENTION

In consequence, amongst other things, it is an object of the present invention to simplify and speed up the readout, whilst on the other hand allowing to ensure the correctness of the measurement as much as possible through engineering a quasi-uniformly distributed readout facility.

Now therefore, according to one of its aspects, the invention is characterized according to the characterizing part of Claim 1. The algorithm can be relatively simple, such as an overall averaging. On the other hand, certain cells of the subset can get different weights, depending on the object that will be irradiated. Typical applications would run from dental to mammography, and from pre-operative irradiation of a single person to radiation screening of a mass-population. Especially the latter usage would require extremely tight radiation-dose control, and upon reaching prescribed dose, the irradiation could be immediately terminated.

Another closely related aspect of the invention is characterized according to the characterizing part of Claim 2. The start of the integration should be synchronous with the start of the irradiation, and the trigger signal can be used for global reset of the cells so that charge accumulation can start immediately.

Advantageously, the present invention can use the same pixel output for both control and measurement signals, thereby simplifying peripheral electronics.

Advantageously, the algorithmic means are programmable, such as through determining a scale factor based on the weight, age, or other characteristics of the subject to be irradiated. Various distributed arrangements for the signalizing cells are feasible.

Advantageously, the subset of cells is uniformly tessellated across substantially the whole of said array. This renders the representation of actual irradiation substantially uniform. The tessellation can be rectangular or even restrict to a subset of driver lines of said array, with cells within the tessellation being column-wise staggered among successive such driver lines. This necessitates only an extremely low number access operations.

Advantageously, the distributed C-MOS cells each have a read-out transistor with a control electrode that is adjacent to two different control conductors which are arranged for selective hardwired interconnection to said control electrode for thereby creating two different groups of cooperating cells from said distributed C-MOS cells. Peripheral on-chip drivers could in this manner produce two different subsets, such as one to effectively start the integration, and the other to terminate the irradiation. Further advantageous aspects of the invention are recited in dependent Claims.

BRIEF DESCRIPTION OF THE DRAWING

These and further features, aspects and advantages of the invention will be discussed more in detail hereinafter with reference to the disclosure of preferred embodiments of the invention, and in particular with reference to the appended Figures that illustrate.

DETAILED DESCRIPTION OF PREFERRED EMBODIMENTS

Figure 1:
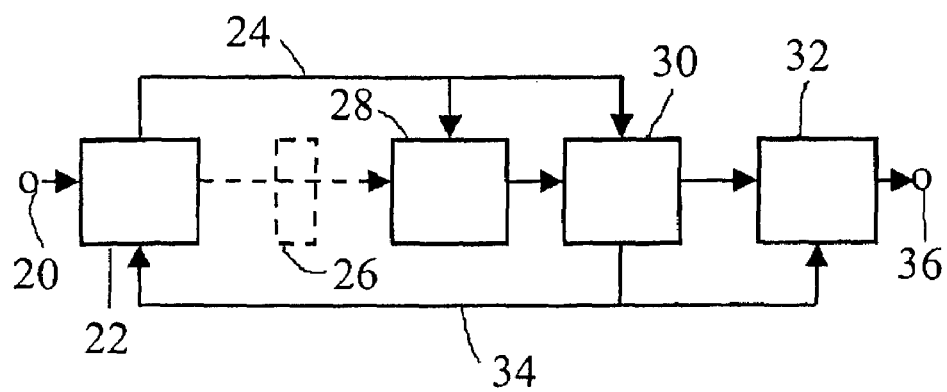
FIG. 1, an overall arrangement of an apparatus of which the invention forms part.

FIG. 1 illustrates an overall embodiment of an apparatus in which the invention is applied. Herein, a source 22 of irradiation, such as X-ray, is made to temporarily irradiate an object 26, such as a human person or a part thereof. The purpose of irradiation can be diagnostic, which will be considered to be the case here. In principle, other purposes are feasible, such as recognized by persons skilled in the art. The transmission pattern of the radiation is measured by a C-MOS array 28, and upon termination of the irradiation period, read out for use by a radiologist or other.

Now, the operation is started by a start command on control terminal 20. At this instant, a reset command will be given to measuring CMOS array 28 and to the combining or arithmetic means 30. Furthermore, the irradiation of object 26 will commence, and the irradiation will lead to charge accumulation in the cells of CMOS array 28. A subset of multiple distributed C-MOS cells across the array are targeted for contributing to the dose measurement. This contributing is effected by repeated non-destructive readout thereof to arithmetic means 30. The readout of array 28 is effected in relatively brief intervals wherein the irradiation can be paused if necessary. If necessary, a certain calibration factor can be applied for converting the reading acquired to an actual dose figure. The optimum dose can be found from the data readout. For example, the readout subset of cells may exhibit a sufficient amount of image contrast. The necessary dose can be a function of the irradiated subject, such as being dependent on the body weight. In other situations, the average absolute dose would be determinative.

Now, if the right dose has been attained, a termination signal will appear on line 34. On the one hand, this will signal irradiation facility 22 to stop more or less immediately. On the other hand, this will signal evaluation device 32 to read out all CMOS for outputting the measured transmission image on line 36 for further usage. Generally, this will take appreciably more time than the reading of only the subset of cells.

As a different application of the above, the dose signal can be used as a trigger signal to activate the array as a whole for integrating the radiation dose received. To this effect, the feedback will reset all cells to zero, which can be effected in a very brief interval. The measuring of only a few cells for producing the trigger signal will nevertheless result in fast operation. Here, the intended dose should of course have a very low value.

Figure 2:
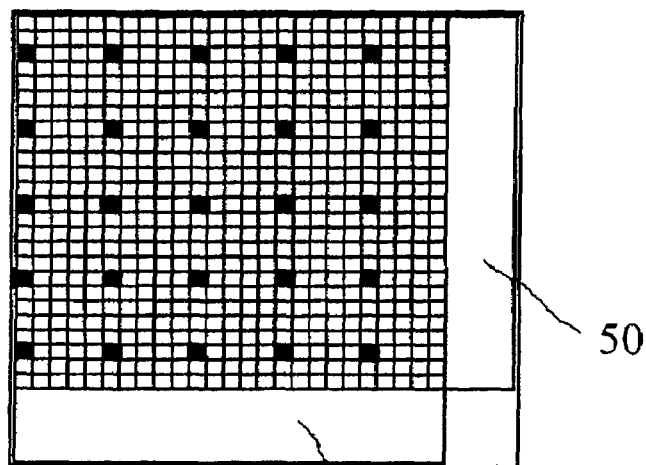
FIG. 2, a first tessellation arrangement.

FIG. 2 illustrate a first tessellation arrangement. Tessellation in this regard means that the cells actually used will form a substantially uniform two-dimensional pattern across the array. If necessary, some deviation from uniformity can be used. Anyway, at the edges of the array always some degree of non-uniformity will be present. This can be seen through comparing the left and right edges of the array: the left hand edge has relatively more dose sensing cells than the right hand edge. The uniformity should be targeted such that the combined dose sensing does not have discrepancies due to any non-uniformity. In fact, if non-uniformity were too large or too small, the algorithmic means that produces the trigger or dose signals could introduce or rather enhance non-uniformities.

Now, the advantage of such (quasi-)uniform distribution is that the outcome is largely independent of shifts in the position of the object. The device has an array of vertical drivers 50 that each will drive all cells of a line. For column read out 52, in this embodiment only each fifth cell is used for measuring, which will need specific addressing. This means that in this embodiment, accessing is only necessary for one fifth of all lines, which can be effected in a sequence that proceeds from top to bottom in the array. In consequence, the embodiment allows to speed up the read-out process by a factor of about five for generating only the dose and/or trigger signals.

Figure 3:
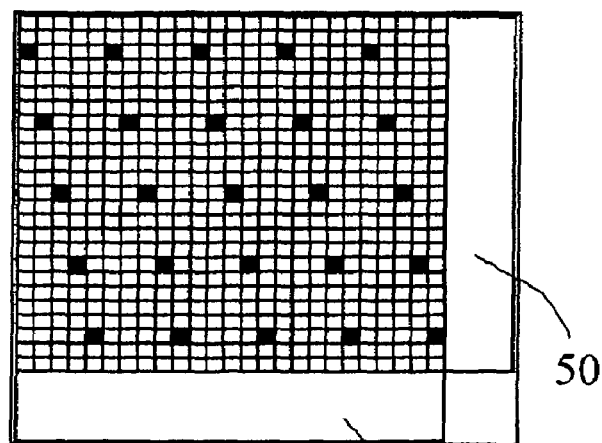
FIG. 3, a second tessellation arrangement.

FIG. 3 illustrates a second tessellation arrangement. Here likewise, only one fifth of the lines is addressed. The advantage of the arrangement is that each column has exactly one cell taken into account. This allows to effect the column readout in only a single one operation. In comparison with FIG. 2 this gives a further speed-up by a factor of five. Of course, in a practical case some further operations could be necessary. To attain the above effects, the measuring cells of the subset have some specific facilities that will be discussed hereinafter with reference to FIG. 4. Various other patterns for locating the dose-measuring cells are feasible.

Figure 4:
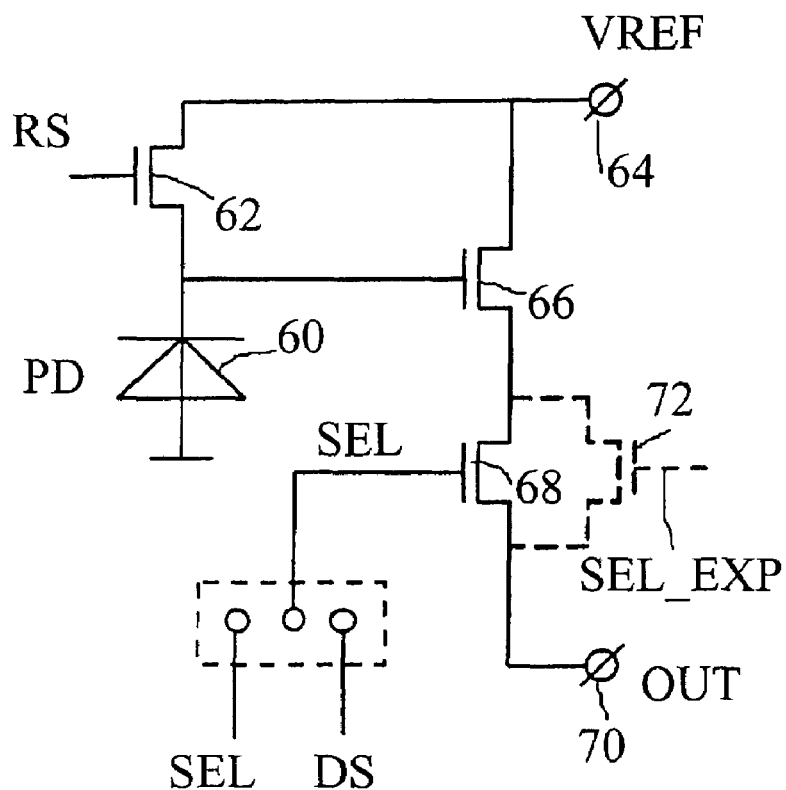
FIG. 4, a circuit arrangement for non-destructive readout.

FIG. 4 illustrates a circuit arrangement for non-destructive readout. The elementary set-up has the radiation measurement device proper 60, reset transistor 62 with control terminal RS, reference voltage terminal VREF 64, SF transistor 66, select gate 68 and output terminal 70. A more extended circuit has a second selection transistor 72 present for selecting the dose measurement cells. Persons skilled in the art will know to interconnect the various cells to realize the dose-sensing patterns of FIGS. 2 and 3. A still further circuit arrangement for hardwired control of generating the subset of cells has the control terminal SEL of transistor 68 adjacent to two different control conductors SEL and DS SEL, respectively. The conductors are arranged in a horizontal or vertical direction for selective hardwired interconnection to said control electrode of transistor 68. The interconnection can be done in one of more processing steps during manufacture. This allows to create two different groups of cooperating cells from the distributed C-MOS cells. A first group could generate the trigger signal, whereas the second group could create the dose-sensing signal. The outputs would appear on terminal 70, and the combining algorithm could have the appropriate form for each of the two usages. Two peripheral input circuits could have an appropriate arrangement for controlling the two subsets of cells and for routing the outputs in a manner to achieve the desired results.

Figure 5:
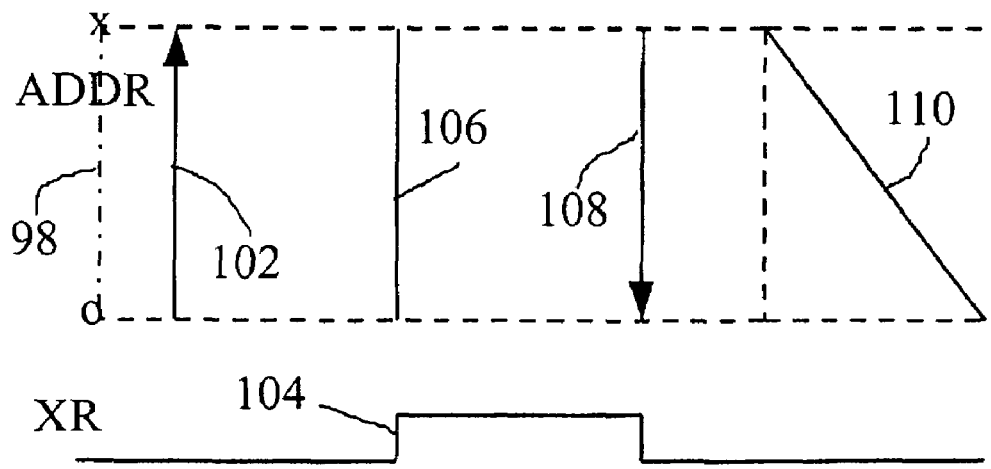
FIG. 5, a time-diagram of the various operations.

FIG. 5 illustrates a time-diagram of the various operations. Vertical range 98 indicates the address range of all array cells. Arrow 102 indicates power on. Edge 104 of X-Ray trace 100 indicates the start of the irradiation. This start is detected by the trigger producing array cells that can for example be located along the edge of the array. Thereupon, line 106 indicates the global reset of all array cells, followed by the integration in all array cells. During irradiation, the amount of radiation received is monitored by the dose sensing subset of cells. Arrow 108 indicates the attainment of the target radiation, and the ensuing termination of the X-Ray radiation along trace 100. Sloped line 110 indicates the sequential read-out of all cells for evaluation of the measurement. Thereupon, a next measurement can be effected.

According to the invention, multiple options exist for trigger or dose control. Finally, there will always be some kind of algorithm that compares the sense information with some kind of set-point.

For a prototype for a dental product, it was found that the maximum statistical deviation from the average was about 2% for various different images under consideration. It was considered that such one-digit percentage variation was perfectly allowable. Furthermore, an important feature of the invention is that full-frame image information can become available at line speeds. Higher dose sensing resolution can be achieved through multiple line reads in the proposed approach.

Now, the present invention has hereabove been disclosed with reference to preferred embodiments thereof. Persons skilled in the art will recognize that numerous modifications and changes may be made thereto without exceeding the scope of the appended Claims. In consequence, the embodiments should be considered as being illustrative, and no restriction should be construed from those embodiments, other than as have been recited in the Claims.

The invention claimed is:

1. An array-based C-MOS image sensor device comprising an array of C-MOS cells that is provided with a facility for on the basis of non-destructive cell readout generating a radiation dose-sensing signal, said device being characterized in that said facility is arranged for accessing a subset of multiple distributed C-MOS cells across the array and feeding by such accessed cells an algorithmic means for therein generating an overall feedback dose control signalization and in that said distributed C-MOS cells have additional transistor readout means for selectively feeding said algorithmic means.

2. A device as claimed in claim 1, wherein said algorithmic means are programmable.

3. A device as claimed in claim 1, and wherein said subset of cells is uniformly tessellated across substantially the whole of said array.

4. A device as claimed in claim 3, wherein said tessellation is rectangular.

5. A device as claimed in claim 3, wherein said tessellation restricts to a subset of driver lines of said array, and cells within the tessellation are column-wise staggered among successive such driver lines.

6. A device as claimed in claim 1, being specifically arranged for sensing X-Ray radiation.

7. An array-based C-MOS image sensor device comprising an array of C-MOS cells that is provided with a facility for on the basis of non-destructive cell readout generating a radiation dose-sensing signal,
   said device being characterized in that said facility is arranged for accessing a subset of multiple distributed C-MOS cells across the array of C-MOS cells and feeding by such accessed cells an algorithmic means for therein generating an overall sensing trigger signalization and in that
   said distributed C-MOS cells have additional transistor readout means for selectively feeding said algorithmic means.

8. A device as claimed in claim 7, wherein said algorithmic means are programmable.

9. A device as claimed in claim 7, wherein said distributed C-MOS cells have additional transistor readout means for selectively feeding said algorithmic means.

10. A device as claimed in claim 7, and wherein said subset of cells is uniformly tessellated across substantially the whole of said array.

11. A device as claimed in claim 10, wherein said tessellation is rectangular.

12. A device as claimed in claim 10, wherein said tessellation restricts to a subset of driver lines of said array, and cells within the tessellation are column-wise staggered among successive such driver lines.

13. A device as claimed in claim 7, being specifically arranged for sensing X-Ray radiation.

14. An array-based C-MOS image sensor device comprising an array of C-MOS cells that is provided with a facility for on the basis of non-destructive cell readout generating a radiation dose-sensing signal,
   said device being characterized in that said facility is arranged for accessing a subset of multiple distributed C-MOS cells across the array of C-MOS cells and feeding by such accessed cell an algorithmic means for therein generating an overall feedback dose control signalization and in that
   said distributed C-MOS cells each have a read-out transistor with a control electrode that is adjacent to two different control conductors which are arranged for selective hardwired interconnection to said control electrode for thereby creating two different groups of cooperating cells from said distributed C-MOS cells.

15. A device as claimed in claim 14, wherein all C-MOS cells in the array of C-MOS cells are identical.

16. A device as claimed in claim 14, wherein, within each C-MOS cell of the subset of multiple distributed C-MOS cells, said facility for generating the radiation dose-sensing signal provides the radiation dose-sensing signal at a readout point that is also used to provide an ordinary image sensing signal.

17. An array-based C-MOS image sensor device comprising an array of C-MOS cells that is provided with a facility for on the basis of non-destructive cell readout generating a radiation dose-sensing signal,
   said device being characterized in that said facility is arranged for accessing a subset of multiple distributed C-MOS cells across the array of C-MOS cells and feeding by such accessed cell an algorithmic means for therein generating an overall sensing trigger signalization and in that
   said distributed C-MOS cells each have a read-out transistor with a control electrode that is adjacent to two different control conductors which are arranged for selective hardwired interconnection to said control electrode for thereby creating two different groups of cooperating cells from said distributed C-MOS cells.

18. A device as claimed in claim 17, wherein all C-MOS cells in the array of C-MOS cells are identical.

19. A device as claimed in claim 17, wherein, within each C-MOS cell of the subset of multiple distributed C-MOS cells, said facility for generating the radiation dose-sensing signal provides the radiation dose-sensing signal at a readout point that is also used to provide an ordinary image sensing signal.

* * * * *